United States Patent [19]

van Valer

[11] 4,138,177

[45] Feb. 6, 1979

[54] SAFETY VEHICLE POWER DISTRIBUTION SYSTEM

[76] Inventor: Andrew F. van Valer, P.O. Box 87, Grass Valley, Calif. 95945

[21] Appl. No.: 791,556

[22] Filed: Apr. 27, 1977

Related U.S. Application Data

[63] Continuation of Ser. No. 677,532, Apr. 16, 1976, abandoned.

[51] Int. Cl.² ...................... H01R 13/60; H01R 13/62
[52] U.S. Cl. .................. 339/8 RL; 191/12.4; 242/107.3; 242/107.6; 339/45 R; 339/119 C
[58] Field of Search ............. 339/5 RL, 6 RL, 8 RL, 339/10, 12 R, 45 R, 45 M, 119 C, 147 C; 191/12.2 R, 12.2 A, 12.4; 242/107.3, 107.6, 107.7

[56] References Cited

U.S. PATENT DOCUMENTS

| | | | |
|---|---|---|---|
| 2,979,576 | 4/1961 | Huber | 339/147 C |
| 3,088,089 | 4/1963 | Gregoire | 339/45 R |
| 3,431,428 | 3/1969 | van Valer | 339/45 M |
| 3,475,715 | 10/1969 | Venaleck | 339/45 R |
| 3,656,781 | 4/1972 | Paine | 339/45 M |
| 3,784,958 | 1/1974 | Harris | 339/45 R |

*Primary Examiner*—Neil Abrams
*Attorney, Agent, or Firm*—Blair, Brown & Kreten

[57] ABSTRACT

A power distribution system for furnishing power to vehicles from a fixed station including a switch in the plug being inserted into the fixed station and an electrically controllable release inside of the plug for physically disconnecting the electric cable from the fixed station when the ignition of the vehicle is turned on, as well as a power operated reel drum on the vehicle to wind up the cable when it is free from the fixed station.

8 Claims, 9 Drawing Figures

FIG. 3.
FIG. 4.
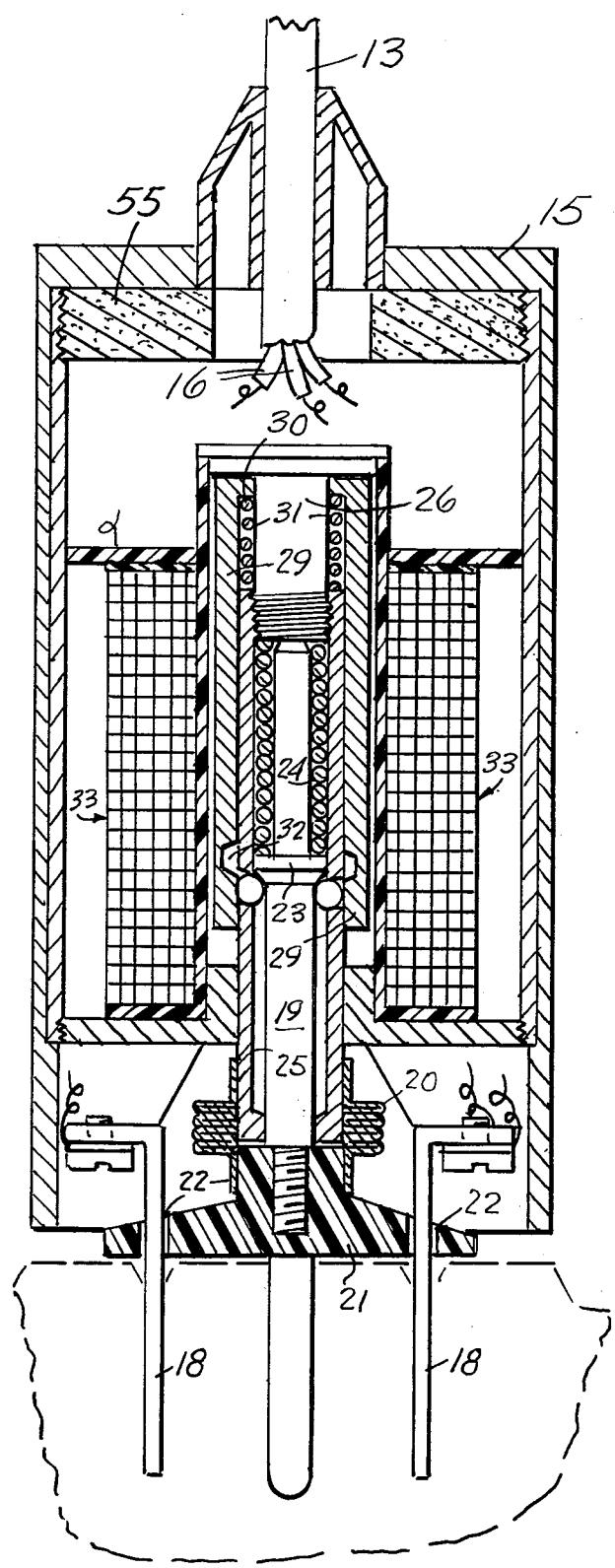
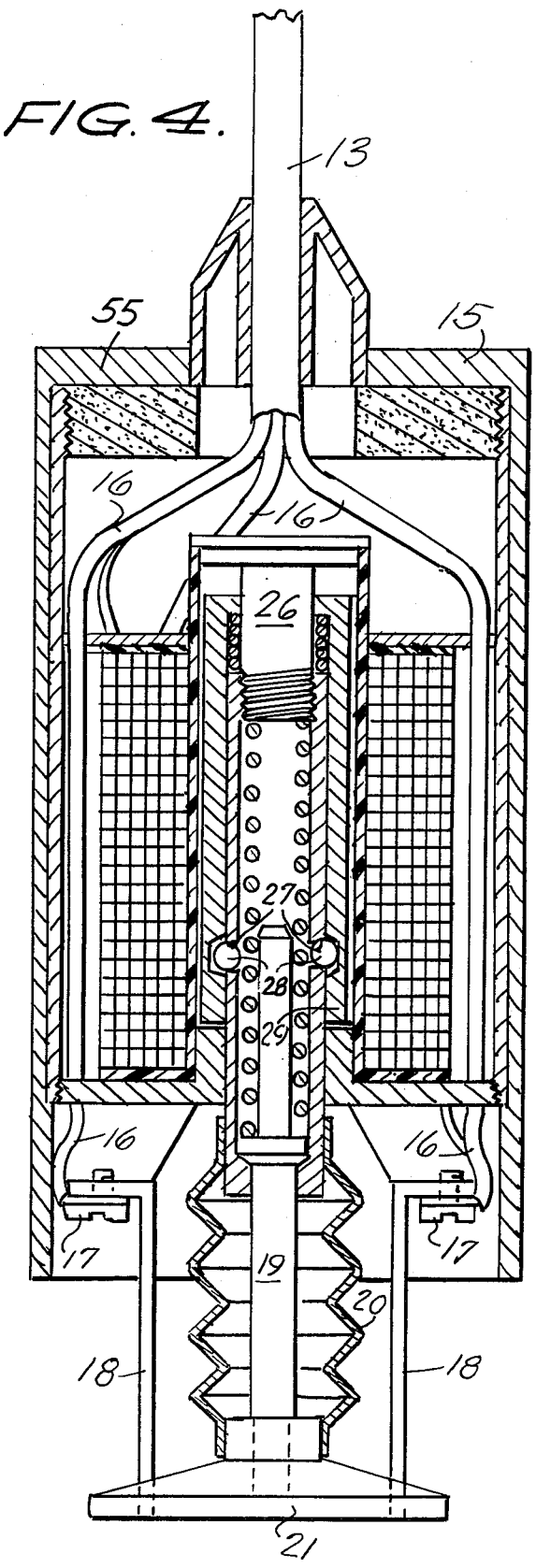

SAFETY VEHICLE POWER DISTRIBUTION SYSTEM

CROSS REFERENCE TO RELATED APPLICATION

This application is a continuation of my now abandoned application Ser. No. 677,532, filed Apr. 16, 1976 entitled SAFETY VEHICLE POWER DISTRIBUTION SYSTEM.

BACKGROUND OF THE INVENTION

1. Field of the Invention

Quick release electrical connectors, as such, are well known in the prior art. For example, U.S. Pat. No. 3,118,713 issued to Ellis, discloses such a quick release electrical connector. Similar connectors are also disclosed in U.S. Pat. Nos. 2,076,136 issued to Wood, and 2,688,734 issued to Welling. The present invention is distinguished from these inventions in that it is directed to a safety system of electrical distribution which incorporates therein a controllably releasable electrical connector and a power operated reel drum on the vehicle for automatically winding up the connecting cable when the vehicle starts and is ready to move away. Connectors which are incorporated in distribution systems and which are broken by the movement of a vehicle are also known. Such systems and connectors are shown in U.S. Pat. Nos. 2,235,262 issued to Miller and 2,748,359 issued to Swan. Such systems rely upon physical movement of the vehicles generally for the disconnect action; however, the present invention is related to a system which includes a disconnect connector and reel drum to retract the cable that are automatically activated when the vehicle ignition switch is actuated.

To appreciate the importance of the present invention it must be placed in its proper context. With the increased use of frozen foods, and the like, refrigeration trucks have become commonplace on the highways. While the trucks are being driven along the highways, the contents thereof are kept in frozen condition at a desired temperature by a refrigeration unit on the vehicle. Oftentimes, however, it is necessary for the truck to sit for long periods of time at a dock or warehouse waiting to be loaded or unloaded. Especially in winter, but at other times also, these docks are often wet from precipitation. Accordingly, if it is desired to connect the refrigeration system to a source of electric energy at the dock, considerable hazard is faced by the operator. In addition, truck drivers tend to worry about the condition of their trucks and their time schedules and to forget to disconnect an interconnection between a fixed power source and the vehicle which may be used to operate the refrigeration system during the long periods when the vehicle was idle. Accordingly, it is desirable to have a system for physically disconnecting the cable from the power source and for winding up the cable on the truck so that it will not dangle and trail behind the truck when it moves away from the power source. The present system is distinguished from those of the prior art in that it electrically physically removes the interconnection between the power source and the vehicle and electrically deadens the cable.

SUMMARY OF THE INVENTION

The principal object of the present invention is to provide an electrical power interconnection and automatic disconnect system for providing power to a vehicle from a fixed source of electrical energy and automatically physically and electrically disconnecting the power source from the fixed source of electric energy when the vehicle is started and more particularly when the vehicle ignition system is placed in operation.

Another object of the present invention is to provide an electrical power interconnection and automatic disconnect system for providing power to a vehicle from a fixed source of electrical energy and automatically physically and electrically disconnecting the power cable between the vehicle and the fixed source of power, from the source of power, and at the same time energizing a take-up reel for winding the cable, when the vehicle ignition system is placed in operation.

Other objects and features of the invention will become apparent from the specification which follows and from the drawings to which reference is made.

BRIEF DESCRIPTION OF THE DRAWINGS

FIG. 3 is a view of the connecting plug taken along the line 3—3 of FIG. 1;

FIG. 4 is another view of the connecting plug with the disconnect spring and plunger extended;

DESCRIPTION OF THE PREFERRED EMBODIMENT

Figure 2:
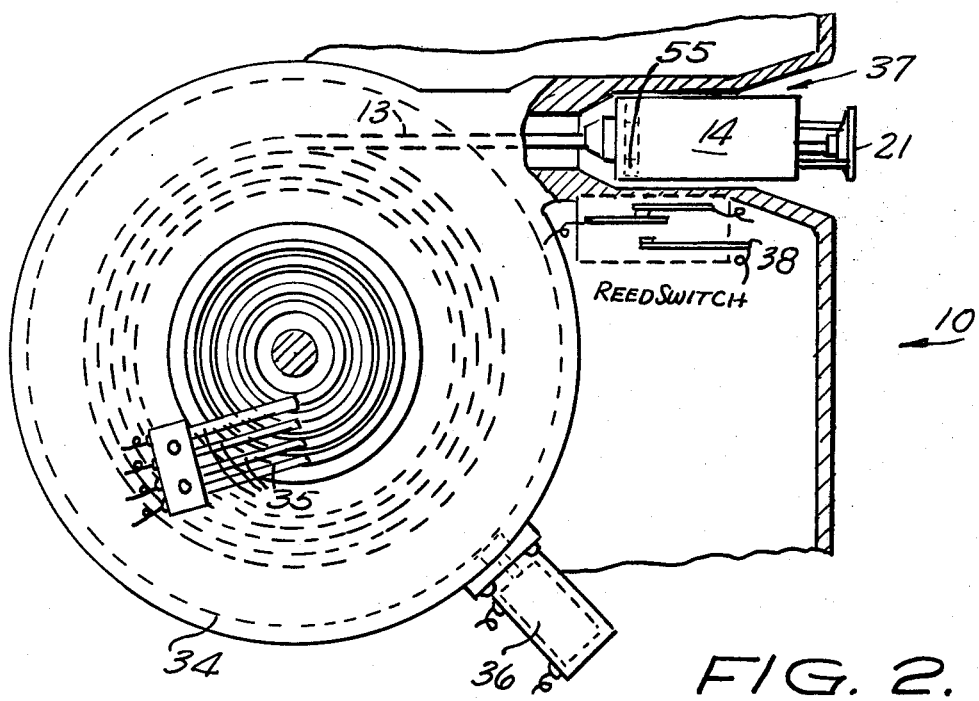
FIG. 2 is a plan view of the take-up reel, with the cable fully wound, and showing various electrical switches.
Figure 1:
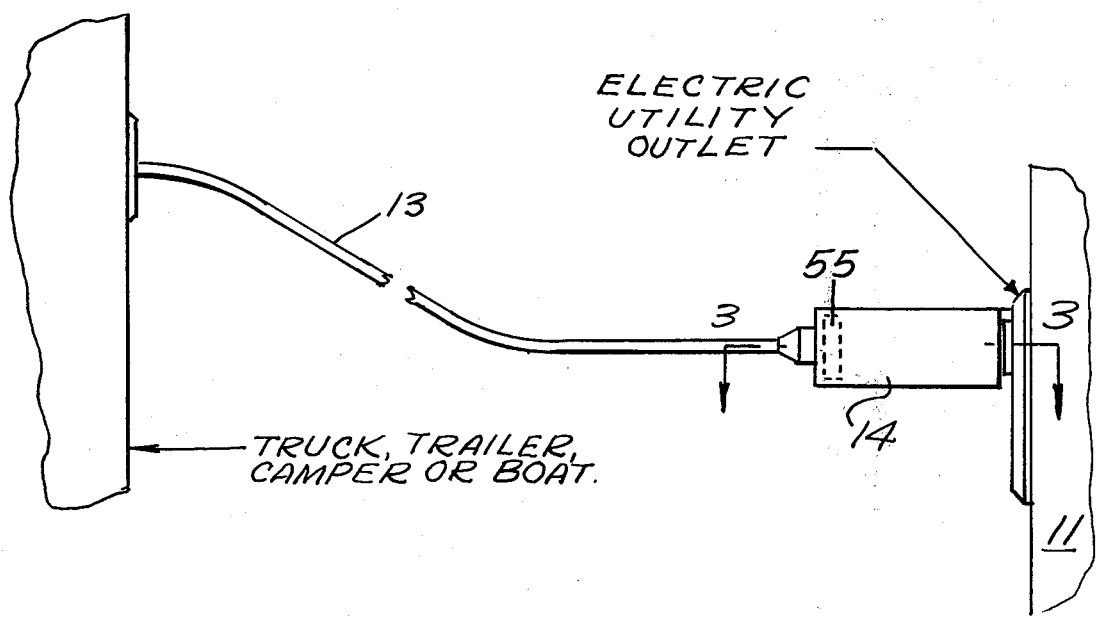
FIG. 1 shows a cable connected between a vehicle and a fixed source of electrical energy.

Referring now to the drawings in detail, wherein like reference characters indicate like parts throughout the several figures, the reference numeral 10 indicates generally a safety vehicle power distribution system incorporating a fixed source of electrical energy 11, the source 11 having a standard wall type receptacle, as is in use everywhere today.

A vehicle 12, which may be a truck, trailer, camper, or boat, for example, has a cable 13 running from it to the power source 11, and the cable 13 has on its end a connector 14 for attachment to power source 11.

Turning to FIGS. 3 and 4 for a detailed view of the connector it can be seen that cable 13 enters a connector housing 15, the cable 13 comprising several wires 16, a pair of which extend along the inside of housing 15 and terminate at screw fastenings 17. Screw fastenings 17 comprise the electrical connections and internal terminals for a pair of prongs 18, these prongs 18 serving as male electrical connections to be inserted into power source 11.

Positioned in the center of connector housing 15 there is a movable plunger 19 which is employed to break the cable connection, as will be described more fully hereinafter. Surrounding the outer end of plunger 19 there is a bellows 20 made of some flexible material, the bellows shown compressed in FIG. 3 and expanded in FIG. 4.

On the outer end of bellows 20 there is attached a rigid collar 21, the collar 21 having a pair of holes 22 drilled therethrough for passage of the prongs 18, the collar 21 sliding along the prongs 18 when the bellows 20 is expanded.

About midway up the length of plunger 19 there is a shoulder 23 which projects out a little way beyond the diameter of the plunger 19 and has a tapering bottom side. Encircling the upper end of plunger 19 there is a relatively strong coil spring 24, shown compressed in FIG. 3 and expanded in FIG. 4.

Also enclosing the plunger 19 there is a plunger housing 25 that has bellows 20 attached to its lower end, and a threaded end stub 26 to seal its upper end. It should be observed that coil spring 24 is likewise enclosed in plunger housing 25 and that this spring operates between shoulder 23 and threaded end stub 26.

About midway along the length of plunger housing 20 and on opposite sides thereof, there are drilled a pair of holes 27 to receive a pair of balls 28, the diameter of balls 28 being slightly longer than the thickness of the walls of housing, as will be explained more fully hereinafter.

Surrounding the plunger housing 25, and movable slightly relative thereto, there is a sliding sleeve 29 which can move along the axis of the plunger 19. The outer end of the sleeve 29 terminates in a short L-shaped projection 30 that operates as a base for a small spiral spring 31 which is wrapped around end stub 26, with the opposite end of spring 31 pressing against the top of sliding sleeve 29. A short distance from the bottom end of sleeve 29, there are a pair of shallow grooves 32 cut into the sleeve but with a depth less than the diameter of balls 28.

Completely surrounding the plunger 19, its housing 25, and the sliding sleeve 29, there is a magnetic winding 33, duly connected to one of the leads from cable 13, whereby the winding 33, when energized by the cable 13, can cause plunger 19 to move.

In FIG. 2 there can be seen an enlarged view of a take-up reel 34 which is used to store cable 13 when the cable is not attached to a fixed power source 11. Take-up reel 34 has a plurality of contact switches 35 which complete electrical circuits even though the reel is turning. An electrical plunger brake 36 presses against the side of the reel 34, and when connector 14 is pulled into a recess 37 in the vehicle body and cable 13 is fully wound up, connector 14 operates a reed switch 38 to indicate this fact.

Figure 5:
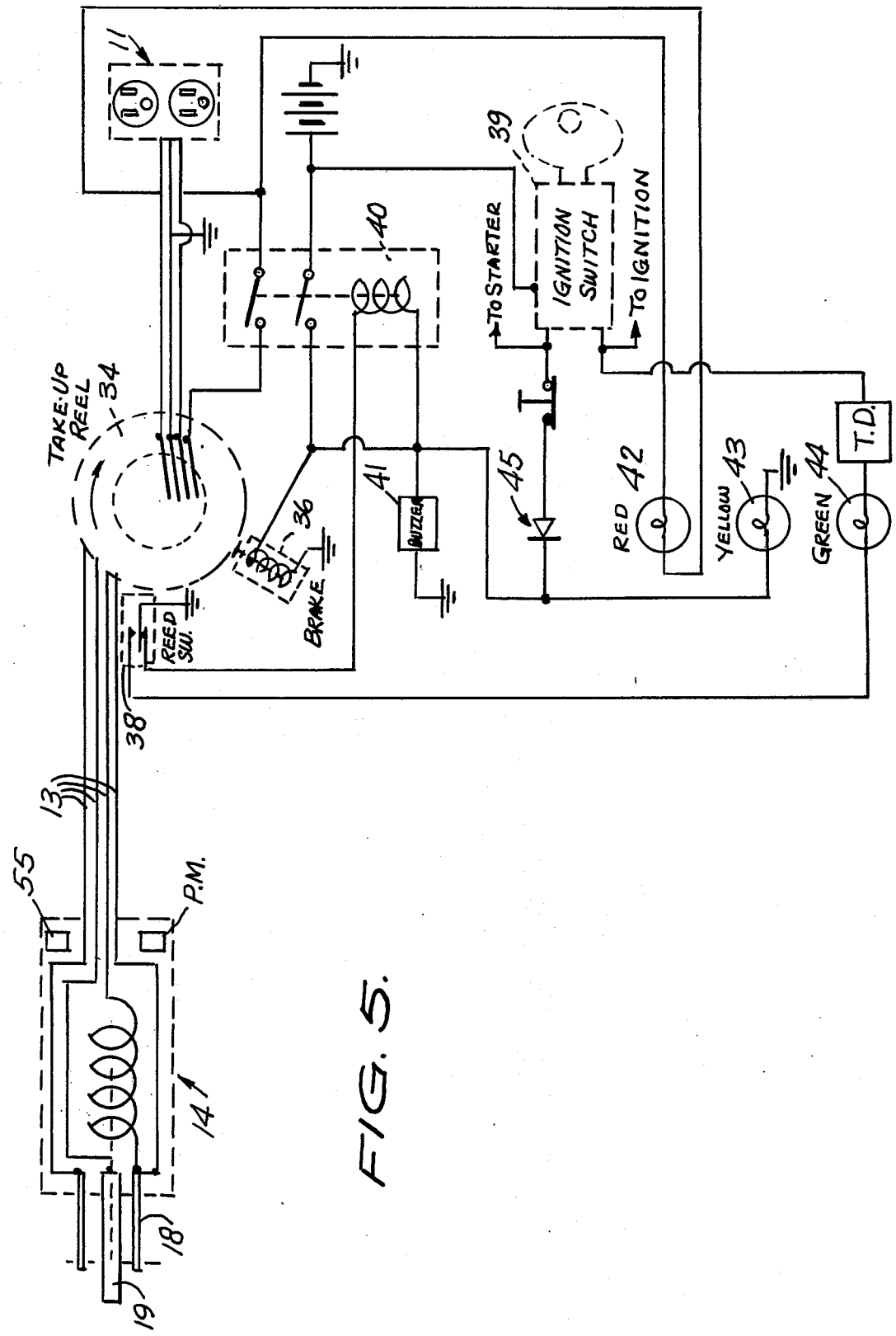
FIG. 5 is a circuit diagram of the vehicle ignition switch, take-up reel, connection plug, and indicator lights.
Figure 6:
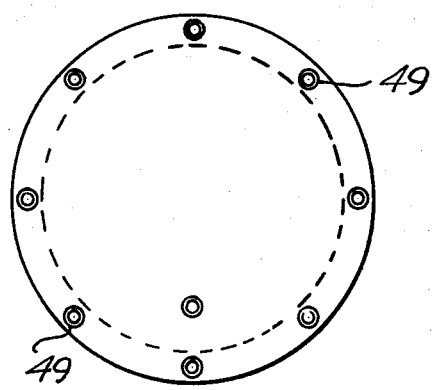
FIG. 6 is a front elevation view of another form of connection plug.
Figure 7:
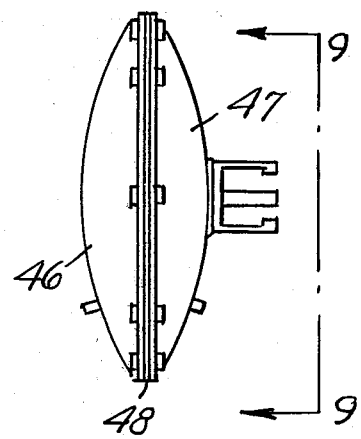
FIG. 7 is a side elevation view of the other form of connection plug.

FIG. 5 which shows a circuit diagram for the present safety system, indicates how the invention is energized when vehicle ignition switch 39 is turned on. There is a magnetic relay 40, a buzzer 41, as well as red, yellow, and green lights 42, 43 and 44 respectively. A diode 45 is included in the circuit to prevent any feedback to the vehicle starter.

In FIGS. 6-9 there is illustrated a modification of the disconnect plug which may be either air or vacuum operated. Here the plug is composed of two half spheres 46 and 47 which are placed together with a diaphragm 48 put between them, the entire assemblage being firmly bolted together by means of a plurality of bolts 49 equally spaced around the periphery of spheres 46, 47.

Through the side of half sphere 46 there is mounted a nipple connection 50 for the attachment of an air pressure hose (not shown). On the opposite half sphere, namely 47, there is mounted another connection 51 for attachment to a source of vacuum (not shown). Also forming a part of half sphere 47 there is a receptacle, plug, or switch support 52 for insertion into the fixed source of energy 11.

The center of diaphragm 48 has bolted to it a plunger 53, positioned so that it will pass through a hole in the middle of plug 52, while wrapped around plunger 53 there is a strong spiral spring 54. From this structure, and as clearly shown in FIG. 8, if air pressure is applied through nipple connection 50, or else vacuum is applied through connection 51, then diaphragm 48 will be moved sharply to the right and force plunger 53 through the center hole of plug 52 and thereby automatically disconnect plug 52.

In the use and operation of the invention a vehicle 12 pulls along side of a building, or other structure, having a source of energy 11. The vehicle operator grabs hold of connector 14 and pulls cable 13 from the take-up reel 34, and inserts prongs 18 into the wall receptacle of the power source.

When the connector 14 is pressed against the receptacle, collar 21 rides along prongs 18 and bellows 20 folds back, pushing plunger 19 up into plunger housing 25. This compresses the larger spiral spring 24 and locks the plunger in place. The locking arrangement occurring when shoulder 23 on plunger 19 moves up above the grooves 32 and the small spring 31 causes balls 28 to drop into grooves 32 and lock plunger 19 in a depressed or locked position.

The balls 28 cannot be positioned into the locked position until the plunger 19 is depressed because they otherwise ride on the main release spring 24 outer diameter. When the plunger 19 is fully depressed, spaced below the balls (holes 27) appears for the balls to drop into, and the second spring (31) moves a collar (29) back over the outside edge of the balls, locking the balls in place and hence plunger 19 in place.

Once this is done the vehicle operator can then leave the vehicle, with connector 14 securely fastened into the receptacle. An electrical brake 36 on the cable take-up reel 34 holds the cable in extended position as desired.

When the driver returns to his vehicle and wishes to depart, to disconnect the cord, all he has to do is to turn the ignition key 39 to the Start position. This action energizes relay 40 which applies potential to coil winding 33 in connector 14.

When potential is applied to winding 33, in connector 14, the sliding sleeve 29, which is made of iron, responds to the magnetic field by sliding downward against the bias of small spring 31, toward the end of the connector. This action releases balls 28 which in turn releases plunger 19 so that big spring 24 forcefully extends collar 21 against the receptacle, effectively disconnecting connector 14 and therefore cable 13.

At the same time, potential is applied to the winding of brake 36, on the take-up reel 34, to release the brake, so that reel 34 winds up cable 13. When the cable 13 is all wound up, a permanent magnet 55, in connector plug 14, activates a reed switch 38 on the vehicle, which turns off warning lights 42 and 43 and buzzer 41, and turns on an "OK" green light 44. Relay 40 is similarly turned off (FIG. 5).

The brake 36 is now engaged on the take-up reel 34 by removing the potential, and the reel is locked in place. If the cable 13 is, by some chance, pulled out of its "home" position, with ignition 39 still on, the warning lights 42, 43 and buzzer 41 will again be activated, and relay 40 will be activated.

Figure 8:
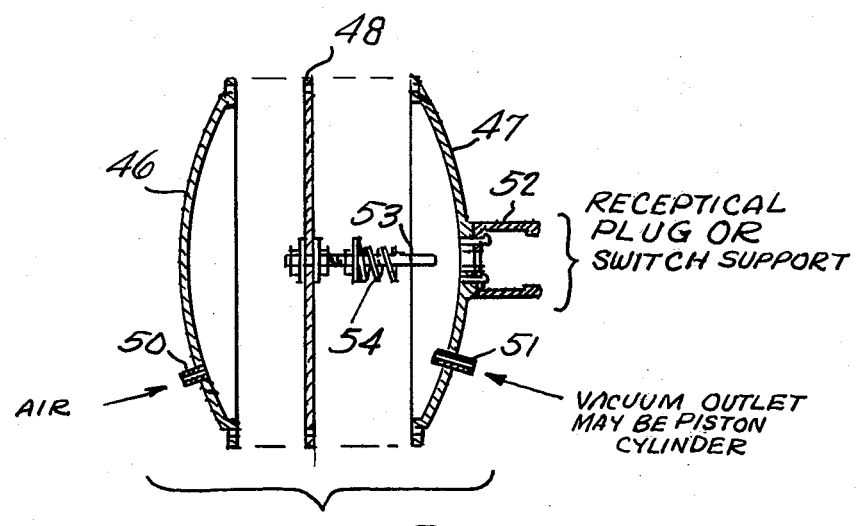
FIG. 8 is a view of the other form of connection plug disassembled.
Figure 9:
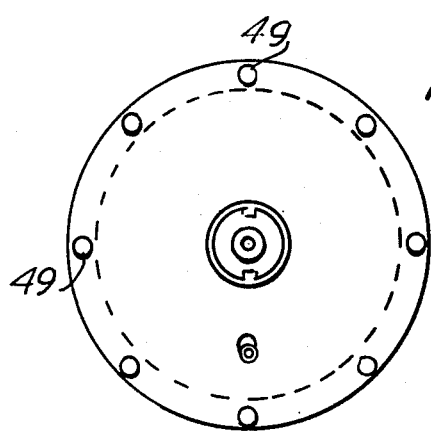
FIG. 9 is a view of the plug looking in the direction of the lines 9—9 of FIG. 7.

The alternative method of obtaining disconnection of connector 14, as illustrated in FIG. 8, is also operated when the ignition switch 39 is turned on. In this case, air pressure, as used for the vehicle brakes, or else vacuum also present on the vehicle, or both, are applied through connections 50 and 51, to move diaphragm 48 and plunger rod 53 to forceably eject the connector from the wall receptacle.

Having thus described the preferred embodiment of the invention it should be understood that numerous structural modifications and adaptations may be resorted to without departing from the spirit of the invention.

What is claimed is:

1. A safety vehicle power distribution system for supplying electrical power to a vehicle when the vehicle is parked and for automatically physically disconnecting the system comprising a source of electrical power, cable means connecting the vehicle to the source of power, a connector on the end of the cable nearest the power source for attachment to the power source, means within the connector for physically separating the connector from the source of power, and power activated means on the vehicle for drawing in and storing the cable when the connector and power source have been separated, said power activated means comprising a take up reel having centrally disposed plural contact switches which complete the circuit at all times, brake means disposed on said reel which is selectively energized to constrain said take up reel, said connector being provided with magnetic elements which serve as an indicator that the connector and cable have been completely taken up, and means on said take up reel to sense the presence of said magnetic elements to engage said brake.

2. The device of claim 1 wherein the connector has a plurality of prongs for insertion into the source of power and for applying power obtained from the source to the cable.

3. The device of claim 2 wherein the means within the connector for physically separating the connector from the source of power includes a magnetic responsive covering over a movable plunger, spring means cooperating to move the covering over the plunger, latch means on the plunger for locking the plunger in a restricted position with the spring compressed, and an electrical coil for releasing the latch means so that the spring forces the plunger outward against the source of power to thereby separate the connector from the source of power.

4. The device of claim 3 whereby the electrical coil in the connector is energized when the vehicle ignition is turned on.

5. The device of claim 2 whereby the means within the connector for physically separating the connector from the source of power is operated by air pressure diaphragm.

6. The device of claim 2 whereby the means within the connector for physically separating the connector from the source of power is operated by vacuum diaphragm.

7. The device of claim 1 in which said means to sense the presence of said magnetic elements is a reed switch.

8. The device of claim 7 further including indicator lights, activated by the take-up reel, to indicate whether or not the cable has been fully rewound on the reel.

* * * * *